United States Patent [19]

Andrieu et al.

[11] Patent Number: 5,202,009

[45] Date of Patent: Apr. 13, 1993

[54] ELECTROLYTE SOLIDE POLYMERE RETICULE

[75] Inventors: Xavier Andrieu; Jean-Pierre Boeuve, both of Bretigny sur Orge, France

[73] Assignee: Compagnie Generale d'Electricite, Paris, France

[21] Appl. No.: 603,510

[22] Filed: Oct. 26, 1990

[30] Foreign Application Priority Data

Oct. 26, 1989 [FR] France .................... 89 14061

[51] Int. Cl.$^5$ ............................................ C25B 13/08
[52] U.S. Cl. .................................... 204/296; 521/27; 429/33; 429/192; 252/62.2
[58] Field of Search ............... 204/296; 521/27; 429/83, 192; 252/62.2

[56] References Cited

U.S. PATENT DOCUMENTS 4,357,401  11/1982  Andre et al. ................ 429/192
4,654,279  3/1987   Bauer et al. ................ 429/192
4,830,939  5/1989   Lee et al. ................... 429/192

FOREIGN PATENT DOCUMENTS 0037776  10/1981  European Pat. Off. .
0249940  12/1987  European Pat. Off. .
1907620  2/1970   Fed. Rep. of Germany .

OTHER PUBLICATIONS

Solid State Ionics, vol. 18/19, part I, Jan. 1986, pp. 321-325, Elsevier Science Publishers B.V., Amsterdam, Netherlands; T. Takahashi et al.: "Chemical Modification of Poly(Ethylene Imine) for Polymeric Electrolyte".

Primary Examiner—John Niebling
Assistant Examiner—Kathryn Gorgos
Attorney, Agent, or Firm—Sughrue, Mion, Zinn, Macpeak & Seas

[57] ABSTRACT

A cross-linked polymer solid electrolyte of a polyether having amine functions cross-linked by a curing compound including two epoxy functions, and thereby defining a three-dimensional lattice which complexes an ionizable salt of the formula $M^+X^-$, where $M^+$ is selected from $Li^+$, $Na^+$, $K^+$, $Ca^{2+}$, and $NH^{4+}$, and $X^-$ is selected from $ClO_4^-$, $CF_3SO_3^-$, $SCN^-$, $BF_4^-$, $I^-$, $Br^-$, $N_3^-$, $BH_4^-$, $CF_3CO_3^-$, $AsF_6^-$, and $PF_6^-$, the proportion by weight of salt in the electrolyte lying in the range 5% to 40%.

11 Claims, No Drawings

ELECTROLYTE SOLIDE POLYMERE RETICULE

BACKGROUND OF THE INVENTION

1. Field of the Invention

The present invention relates to a cross-linked polymer solid electrolyte.

2. Description of the Art

Conventional polymer solid electrolytes based on polyethylene oxide (PEO) or on polypropylene oxide (PPO) have low ionic conductivity at ambient temperature ($10^{-7}$ S/cm). Only the amorphous phase provides conduction, and conduction is only really good beyond the melting temperature of the polymer. By reducing the vitreous transition temperature of the polymer, eliminating crystalline zones and using smaller molecular masses, it is possible to increase ionic conductivity. The counterpart of these improvements is often a considerable degradation of mechanical properties.

Film strength can be increased by cross-linking conductive polymers, but this reduces conductivity.

Polymer solid electrolytes are also known that include plasticizing agents.

In the article by P. M. Blonsky and D. F. Shriver published at pages 6854-55 of J. Am. Chem. Soc. 1984.106, a polymer of the poly(bis(methoxy ethoxy)-phosphazene) type is described which incorporates short chains of PEO whose ionic conductivity at 25° C. exceeds $10^{-5}$ S/cm. Both the electrochemical stability and the mechanical properties of this new compound are limited.

In patent document U.S. Pat. No. 4,654,279, Bauer et al. describes a polymer solid electrolyte constituted by two interpenetrating phases: a cross-linked inert solid phase and a polymer liquid phase (a low mass polyether) having good ionic conductivity ($>10^{-4}$ S/cm). The relative proportions of the cross-linked phase and of the liquid are chosen so as to combine good mechanical properties and good electrochemical properties. The ionic conductivity of this electrolyte is of the order of $10^{-4}$ S/cm at ambient temperature.

In patent document U.S. Pat. No. 4,792,504, G. Schwab and M. T. Lee disclose a solid electrolyte whose matrix supporting the liquid phase is constituted by PEO cross-linked by a compound of the polyacrylate type. The liquid in which a metal salt is dissolved in a low molecular mass polyether or an aprotic solvent.

Patent document EP-A-037 776 describes a cross-linked polymer solid electrolyte including a polyether having amine functions cross-linked by a curing compound that may include two epoxy functions. This electrolyte can only be used satisfactorily, i.e. with adequate ionic conductivity, at a high temperature of the order of 70° C. to 100° C.

SUMMARY OF THE INVENTION

An object of the present invention is to provide a cross-linked polymer solid electrolyte having good mechanical strength, optionally including a plasticizing agent, and in either case having ionic conductivity which is greater than that of prior electrolytes.

The present invention provides a cross-linked polymer solid electrolyte comprising a polyether having amine functions cross-linked by a curing compound including two epoxy functions, the electrolyte being characterized by the fact that said amine functions are two terminal functions, thereby defining a three-dimensional lattice which complexes an ionizable salt of the formula $M^+X^-$, where $M^+$ is selected from $Li^+$, $Na^+$, $K^+$, $Ca^{2+}$, and $NH_4^+$, and $X^-$ is selected from $ClO_4^-$, $CF_3SO_3^-$, $SCN^-$, $BF_4^-$, $I^-$, $Br^-$, $N_3^-$, $BH_4^-$, $CF_3CO_3^-$, $AsF_6^-$, and $PF_6^-$, the proportion by weight of said salt is in the electrolyte lying in the range 5% to 40%.

DETAILED DESCRIPTION OF THE INVENTION

Said polyether is selected from a polyethylene oxide, a polypropylene oxide, a statistical copolymer thereof, alternated, block sequenced, or grafted by polyethers. Its proportion by weight may be up to 80%. Its molecular mass lies in the range 300 to 100,000.

The curing compound may be of the diglycidyl type, a polyepoxy resin, or a polyether having two terminal epoxy functions. The concentration of this curing compound is preferably chosen so that the epoxy/amine ratio lies in the range 0.5 to 5. Such concentrations enable the best compromise to be obtained between mechanical properties and electrochemical properties.

The amine functions of the polyether react with the epoxy groups which open. The secondary amine functions that are formed may react in turn with the epoxy groups. This set of reactions ensures that cross-linking takes place and that a three-dimensional lattice is formed. The minimum size of the cross-linked lattice is fixed by the chain length of the polyether resin that is used.

The electrolyte of the invention may further include a non-reactive plasticizing agent compatible with polyether, having a high dielectric constant and a low vapor pressure. It may be a dipolar aprotic solvent (propylene carbonate, ethylene carbonate, butyrolactone, ...), a glyme (tetraglyme, hexaglyme, ...), or a glycol dimethylether (polyethyleneglycol dimethylether, ...). It may also be a mixture of a plurality of solvents. The cross-linked polymer may include up to 80% solvent.

The polyether is cross-linked in the presence of the plasticizing agent and it may be initiated thermally.

In a first preferred embodiment, said electrolyte includes a reactive plasticizing agent. It is a polyether including a single terminal epoxy function. This provides a system with pendant chains. This polyether is selected from a polyethelene oxide, a polypropylene oxide, a statistical copolymer thereof, alternated, block sequenced, or grafted with polyethers. Its molecular mass lies in the range 300 to 10,000. The basic polyether is cross-linked in the presence of the reactive plasticizing agent and cross-linking may be initiated thermally.

The electrolyte of the invention which is solid, a cross-linkable polymer, plasticizable, of high ionic conductivity, and of good mechanical strength, may be used in primary or in secondary electrochemical cells, in an electrochemical double layer supercapacitor, in electrochromic displays, and in all other micro-ionic applications making use of solid electrolytes.

Other characteristics and advantages of the present invention appear from the following description of examples given by way of non-limiting illustration.

EXAMPLE 1

The following are dissolved in 10 cm$^3$ of acetonitrile at 25° C.:

0.5 grams (g) of (5000) bis(amine) polyoxyethylene from Aldrich;

0.1 g of LiClO$_4$; and

10 μl of diglycidyl ether ethylene glycol as curing compound.

After complete dissolution, the mixture is poured into a mold, and then the solvent is evaporated in vacuo. The resulting film is cross-linked for four hours at 100° C. and dried at the same temperature for 15 hours under a primary vacuum.

The ionic conductivity of the film as measured between two nickel electrodes at 25° C. by complex impedance, is $9.10^{-6}$ S/cm.

EXAMPLE 2

An electrolyte is made using the procedure of Example 1 and containing:
2 g of O,O'-bis-(2-aminopropyl)-polyethylene glycol 1990 sold under the trademark Jeffamine ED2001 by Texaco;
0.4 g of $LiClO_4$;
1 g of polyepoxy resin sold under the trademark AW106 by Ciba Geigy.

The ionic conductivity of this film measured at 25° C. is $10^{-6}$ S/cm.

Both of the above examples demonstrate conductivity which is better than that of conventional solid electrolytes with a plasticizing agent.

EXAMPLE 3

The following mixture is made:
0.5 g of (20000)bis(amine) polyoxyethylene from Aldrich;
0.1 g of $LiClO_4$;
15 μl diglycidyl ether ethylene glycol as a curing compound; and
0.7 g of propylene carbonate as a non-active plasticizing agent.

After being thoroughly mixed, the resin is cast into a mold and then cross-linked for 16 hours at 70° C.

The ionic conductivity measured on the film at 25° C. is $1.2 \times 10^{-3}$ S/cm.

EXAMPLE 4

An electrolyte is made using the procedure of Example 3 and containing:
1.5 g of O,O'-bis-(2-aminopropyl)-polyethylene glycol 1900 sold under the trademark Jeffamine ED2001 by Texaco;
0.3 g of $LiClO_4$;
0.3 g of diglycidyl ether ethylene glycol as a curing compound; and
2.6 g of propylene carbonate as a non-reactive plasticizing agent.

The ionic conductivity measured on this film at 25° C. is $10^{-3}$ S/cm.

Examples 3 and 4 show improved conductivity compared with prior electrolytes including a plasticizing agent.

Naturally, the invention is not limited to the examples described. Without going beyond the scope of the invention, any means could be replaced by equivalent means.

We claim:

1. A cross-linked polymer solid electrolyte usable at ambient temperature comprising a polyether having amine functions cross-linked by a curing compound including two epoxy functions, the electrolyte being characterized by that said amine functions are two terminal functions, thereby defining a three-dimensional lattice which complexes an ionizable salt of the formula $M^+X^-$, where $M^+$ is selected from $Li^+$, $Na^+$, $K^+$, $Ca^{2+}$, and $NH^{4+}$, and $X^-$ is selected from $ClO_4^-$, $CF_3SO_3^-$, $SCN^-$, $BF_4^-$, $I^-$, $Br^-$, $N_3^-$, $BH_4^-$, $CF_3CO_3^-$, $AsF_6^-$, and $PF_6^-$, the proportion by weight of said salt in the electrolyte lying in the range 5% to 40%.

2. An electrolyte according to claim 1, characterized by that said polyether is selected from a polyethylene oxide, a polypropylene oxide, a statistical copolymer thereof, alternated, block sequenced, or grafted by polyethers.

3. An electrolyte according to claim 1, characterized by that the molecular mass of said polyether lies in the range 300 to 100,000.

4. An electrolyte according to claim 1, characterized by that the proportion of said curing compound is selected so that the epoxy/amine ratio lies in the range 0.5 to 5.

5. An electrolyte according to claim 1, characterized by that said curing compound is of a diglycidyl compound.

6. An electrolyte according to claim 1, characterized by that said curing compound is a polyepoxy resin.

7. An electrolyte according to claim 1, characterized by that said curing compound is a polyether having two terminal epoxy functions.

8. An electrolyte according to claim 1, characterized by that it further includes a non-reactive plasticizing agent selected from dipolar aprotic solvents having low vapor pressure, glymes, glycol dimethyl ethers, and mixtures thereof.

9. An electrolyte according to claim 1, characterized by that it further includes an active plasticizing agent constituted by a polyether having a single terminal amine or epoxy function.

10. An electrolyte according to claim 9, characterized by that said polyether having a single terminal epoxy or amine function is selected from a polyethylene oxide, a polypropylene oxide, a statistical copolymer thereof, alternated, block sequenced, or grafted by polyethers.

11. An electrolyte according to claim 9, characterized by that the molecular mass of said reactive plasticizing agent lies in the range 300 to 10,000.

* * * * *